(12) United States Patent
Scott et al.

(10) Patent No.: US 8,783,215 B2
(45) Date of Patent: Jul. 22, 2014

(54) TAR SCRUBBER FOR ENERGY RECOVERY FROM GASIFICATION OPERATIONS

(75) Inventors: Patrick M. Scott, Owego, NY (US); Benjamin P. Tongue, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 269 days.

(21) Appl. No.: 13/400,905

(22) Filed: Feb. 21, 2012

(65) Prior Publication Data

US 2012/0227683 A1 Sep. 13, 2012

Related U.S. Application Data (60) Provisional application No. 61/450,957, filed on Mar. 9, 2011.

(51) Int. Cl.
*F02B 43/08* (2006.01)

(52) U.S. Cl.
USPC ............................ 123/3; 422/141; 422/600

(58) Field of Classification Search
CPC ............... C10J 2300/0916; C10J 2300/0946; F02C 3/28; F02C 5/00; F02C 3/20; F02B 43/08; F02B 43/10; F02G 2254/11
USPC ....... 123/3, 1 A, 1 R; 518/726; 422/141, 188, 422/600; 435/162, 163, 170; 48/63, 85, 78
See application file for complete search history.

(56) References Cited

U.S. PATENT DOCUMENTS

| | | | |
|---|---|---|---|
| 6,837,910 B1 * | 1/2005 | Yoshikawa et al. ...... 48/197 FM |
| 7,803,845 B2 * | 9/2010 | Boerrigter et al. ............ 518/726 |
| 7,875,090 B2 * | 1/2011 | Dietenberger et al. ..... 48/197 R |
| 7,909,899 B2 * | 3/2011 | Diebold et al. ............. 48/197 R |
| 2009/0064581 A1 * | 3/2009 | Nielsen et al. .................... 48/78 |
| 2009/0183430 A1 * | 7/2009 | Schubert et al. ................... 48/85 |
| 2010/0200810 A1 * | 8/2010 | Schmidt et al. ............... 252/373 |
| 2010/0301273 A1 * | 12/2010 | Blasiak et al. ................ 252/373 |
| 2011/0035990 A1 * | 2/2011 | Kammerloher et al. ........ 44/311 |
| 2011/0158858 A1 * | 6/2011 | Alves Ramalho Gomes ......................... 422/187 |

* cited by examiner

*Primary Examiner* — Noah Kamen
*Assistant Examiner* — Long T Tran
(74) *Attorney, Agent, or Firm* — Kaplan Breyer Schwarz & Ottesen, LLP (57) ABSTRACT

A method and apparatus for generating electrical energy from combustion of biomass is provided. The present invention provides both liquid-phase and gas-phase fuel to an internal combustion engine that is designed to run on both types of fuel. Scrubbing syngas generated in an updraft gasifier with a first petrochemical-based liquid fuel reduces the concentration of tars in the syngas stream and also enables absorption of tars from the syngas into the first liquid fuel. After absorption, the tars form a second liquid fuel that is suitable for direct use in the internal combustion engine. As a result, the syngas provided to the engine is substantially free of tars and the volume of liquid fuel available to the engine is increased.

21 Claims, 5 Drawing Sheets

TAR SCRUBBER FOR ENERGY RECOVERY FROM GASIFICATION OPERATIONS

CROSS REFERENCE TO RELATED APPLICATIONS

This application claims the benefit of U.S. Provisional Patent Application Ser. No. 61/450,957, filed Mar. 9, 2011, entitled "Tar scrubber for Energy Recovery from Gasification Operations," which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to energy generation in general, and, more particularly, to gasification-based energy generation.

BACKGROUND OF THE INVENTION

Many electrical-energy generation systems are based on an electromechanical generator driven by an internal combustion engine. The engine normally runs on a petrochemical-based fuel, such as diesel fuel, gasoline, jet fuel, bunker fuel, and the like. In order to keep the system running for any extended period of time, fuel must be transported to, and stored at, the location where the system is operated. For generation systems used to power a reasonably sized, deployable facility, such as a temporary army base, scientific outpost, mobile hospital, etc., the amount of fuel necessary can be significant.

One way to reduce the amount of fuel that must be transported and stored on site is to use a "waste-to-energy" system to convert locally produced waste (e.g., kitchen waste, municipal solid waste, construction debris, organic waste, or other biomass—henceforth called biomass), into a fuel that can be used in the internal combustion engine. This not only mitigates the expense, complexity, and risks associated with fuel transportation and storage by augmenting the amount of available fuel for the engine, it also reduces waste-disposal overhead at the facility itself. As a result, waste-to-energy conversion systems have become a focus of attention of late.

A common waste-to-energy conversion system includes a gasifier and an internal combustion engine that drives an electric generator. The gasifier converts biomass into synthetic fuel through a process referred to as gasification. Gasification is a well-known process for converting carbon-based materials into gaseous fuels that contain carbon monoxide, hydrogen, carbon dioxide and methane. These vapor-phase fuels are referred to as producer gas or "syngas." In a gasifier, raw material is reacted with a controlled amount of oxygen and/or steam at a high temperature, but with partial combustion. The resultant syngas is either provided directly to an engine designed for its use or, alternatively, converted into a more conventional liquid fuel, via a well-known conversion process (referred to as the Fischer-Tropsch process), for use by a conventional engine.

Unfortunately, during gasification of biomass into syngas, significant amounts of high-boiling-point aromatic hydrocarbon mixtures (e.g., tars, creosote, etc.) are typically generated and are contained in the output syngas stream. These tars are often problematic because once these vapor-phase tars reach exposed cooler surfaces, such as exit pipes, intake manifolds or particulate filters, they can condense and deposit on the surfaces as tars, creosote, etc. leading to blockages and clogged filters. In many applications, while a nuisance, the deposited materials can be removed via routine maintenance operations, such as chimney cleaning, and the like. For waste-to-energy conversion systems, however, the generated tars represent a much more significant problem. Internal combustion engines are extremely sensitive to tar buildup and complications that arise from its presence increase dramatically. The effect of tars on engine components, such as valves, fuel injectors, intake manifolds and fuel lines, can result in onerous maintenance and/or repair requirements.

As a result, great care is taken in prior art waste-to-energy conversion systems to avoid the impact of gasifier-generated tars on the operation of an internal combustion engine. These approaches have historically been directed toward the reduction of tar generation during the gasification phase and/or removal of generated tar from the gasifier output syngas stream.

Gasifiers most commonly used for the gasification of biomass are fixed-bed types that operate in either an updraft (counter flow) or downdraft (co-current) configuration. Updraft gasifiers generate much higher levels of tars in their output syngas than are generated by downdraft gasifiers. As a result updraft gasifiers have historically been avoided in favor of downdraft gasifiers for internal-combustion-engine-based applications in general, and waste-to-energy conversion systems, in particular.

In a downdraft gasifier, biomass is fed to the top of a burning mass and air is drawn down through the mass. The heat of combustion volatilizes much of the organic mass, which passes down to a char zone containing partially combusted material that had already been fed into the system. In the char zone, generated tars react with injected air, water, and carbon dioxide to convert the tars more completely to an output gas stream that includes carbon monoxide and hydrogen. Unfortunately, this configuration also results in more parasitic nitrogen, carbon dioxide and water leaving the gasifier. As a result, the energy content and energy potential of the output gas stream is significantly reduced because so much of the combustion has already occurred in the gasifier. When this gas is fed to the engine, work must be done to draw in and expel the added parasitic nitrogen and carbon dioxide.

After the syngas is generated, it is typically conditioned to remove the tars and other unwanted impurities via tar cracking, scrubbing, or plasma decomposition.

Tar cracking is used to break down the complex tar molecules into simpler light hydrocarbons, typically via the introduction of a catalyst. While tar cracking is an effective way to reduce the tar content in the output gas stream of a gasifier, it results in a lower overall energy mix of carbon monoxide, hydrogen, carbon dioxide, nitrogen and water, relative to the original tar-containing stream.

More commonly, generated tar is normally removed from the output gas stream using conventional scrubbers. Wet scrubbing is an effective process that condenses available tars out of the gas stream using a scrubbing medium, such as a scrubbing oil or process oil, or more typically, water. In addition, wet scrubbing often leads to the formation and accumulation of contaminated wastewater, which must then be treated to avoid polluting the local environment. Typically, however, the scrubbing medium becomes saturated over time and must be replaced or regenerated periodically as part of a routine maintenance program. This increases the overall cost and complexity of the waste-to-energy conversion system, as well as system operation.

Plasma systems have often been used in the prior art to degrade tar molecules in the output gas stream into their atomic constituents. These atomic constituents can then be recombined to form syngas constituents (i.e., carbon monoxide and hydrogen). In a plasma system, the gas stream is heated to very high temperatures (1100° C.) via an electric arc, which is energetic enough to degrade the tar molecules. Unfortunately, it requires a great deal of energy to generate the plasma, which reduces the overall energy-efficiency of the waste-to-energy conversion system.

A system that mitigates the deleterious effects of vapor-phase tars in a syngas stream on an internal combustion engine, while improving the overall energy balance of a waste-to-energy conversion system, would represent a significant improvement over the prior art.

SUMMARY OF THE INVENTION

The present invention enables the conversion of biomass into electrical energy without some of the costs and disadvantages of the prior art. Embodiments of the present invention are particularly well suited for use in stationary systems, landfills and deployable waste-to-energy conversion systems comprising electrical generators driven by internal combustion engines operable with both liquid fuels and syngas.

Prior-art waste-to-energy conversion systems have focused on the reduction of tars in generated syngas to mitigate tar-related complications in their associated internal combustion engines. Typically, these prior-art systems are based on gasifiers selected because they generate syngas having low tar levels—most commonly, downdraft gasifiers. In addition, prior-art waste-to energy systems also typically further reduce the tar content of the generated syngas via post-gasifier tar-reduction sub-systems, such as tar crackers or tar scrubbers. The use of these sub-systems adds considerable expense to these systems, however. In addition, tar cracker and scrubber materials must be periodically replaced or refreshed, which leads to environmental pollution concerns. Further, while the removal of the tars from the syngas makes the syngas useable in sensitive engines, the tars, themselves, represent an unrecovered (and, therefore, wasted) energy potential in these prior-art waste-to-energy conversion systems.

In contrast to prior-art waste-to-energy conversion systems, the present invention does not avoid the generation of tars but exploits it. In fact, in some embodiments, tar generation is promoted. Embodiments of the present invention enable vapor-phase tars in the gaseous output of a gasifier to be absorbed and dissolved in a liquid fuel, thereby increasing the fuel available for powering an internal combustion engine. Further, some embodiments of the present invention suppress the generation of syngas in favor of tars that are then converted into liquid fuel. The present invention enables the production of gas and liquid fuels having greater total recoverable energy content as compared to waste-to-energy conversion systems of the prior art.

An illustrative embodiment of the present invention is a waste-to-energy conversion system that comprises an updraft gasifier for converting biomass into syngas and an internal combustion engine that is configured for operation with both syngas and liquid fuel. The gasifier converts biomass into syngas that contains a significant amount of vapor-phase tars. The tars in the syngas are scrubbed from the syngas stream using liquid fuel as the scrubbing medium. Via the scrubbing operation, the tars are absorbed by the liquid fuel and converted into additional fuel that can be used by the internal combustion engine. As a result, the amount of time that the internal combustion engine can run on a given liquid fuel supply is extended—thereby increasing the electrical generation capacity of the waste-to-energy conversion system.

In some embodiments, tars in the syngas output of the gasifier are first captured by water scrubbers and then transferred from the water into a liquid fuel, such as jet fuel, bunker fuel, diesel fuel, or similar, via liquid-liquid extraction.

In some embodiments, the syngas output of the gasifier is provided to a secondary gas conditioner that includes a non-thermal plasma reactor and a catalyst bed. The plasma reactor is configured to induce a vortex-shaped plasma that segregates the molecules in the syngas output by weight. In the plasma, the heavier tar molecules migrate toward the outer regions of the plasma where they are subject to more intensive energy. In some embodiments, the plasma reactor is fluidically coupled with a catalyst bed having a central channel that carries lighter molecules in the syngas output, as well as hydrogen and carbon monoxide generated from tars by the plasma, through the catalyst bed without their being affected by the catalyst. Those tars not reformed in the plasma enter the catalyst bed toward the perimeter and are thus exposed to the catalyst. As a result, these tars undergo catalytic reformation wherein some or all of the tars decompose into syngas constituents, such as hydrogen and carbon monoxide.

An embodiment of the present invention comprises an apparatus comprising: a first port that is fluidically coupled to a source of a first gas, the first gas comprising syngas and tars; a first reactor, the first reactor being dimensioned and arranged to bring the first gas into contact with a first liquid fuel such that the first liquid fuel absorbs and dissolves tars from the first gas to form a second liquid fuel comprising the first fuel and the dissolved tars; a second port that is fluidically coupled with the first reactor such that the second port receives a second gas that is based on the first gas, the second gas being characterized by a lower concentration of tars than the first gas; and a third port that is fluidically coupled with the first reactor such that the third port receives the second liquid fuel.

DETAILED DESCRIPTION

The following terms are defined for use in this Specification, including the appended claims:

"tars" are defined as compounds representative of high-boiling-point aromatic hydrocarbon mixtures and other organic compounds. An example of a tar is a high-boiling-point aromatic hydrocarbon that results from a gasification reaction.

The goal of any waste-to-energy-conversion is to maximize the amount of combustion that takes place in the internal combustion engine where the generated energy can be used to produce useful work. Embodiments of the present invention enable the capture of vapor-phase tars from the output syngas stream of a gasifier using a first liquid fuel as the scrubbing medium. The captured tars are then converted into a second liquid fuel that can be combined with the first liquid fuel and fed to an internal combustion engine, thereby increasing the total volume of liquid fuel available to power the engine. As a result, embodiments of the present invention recover a greater total amount of energy from a biomass as compared to waste-to-energy conversion systems of the prior art.

Figure 1:
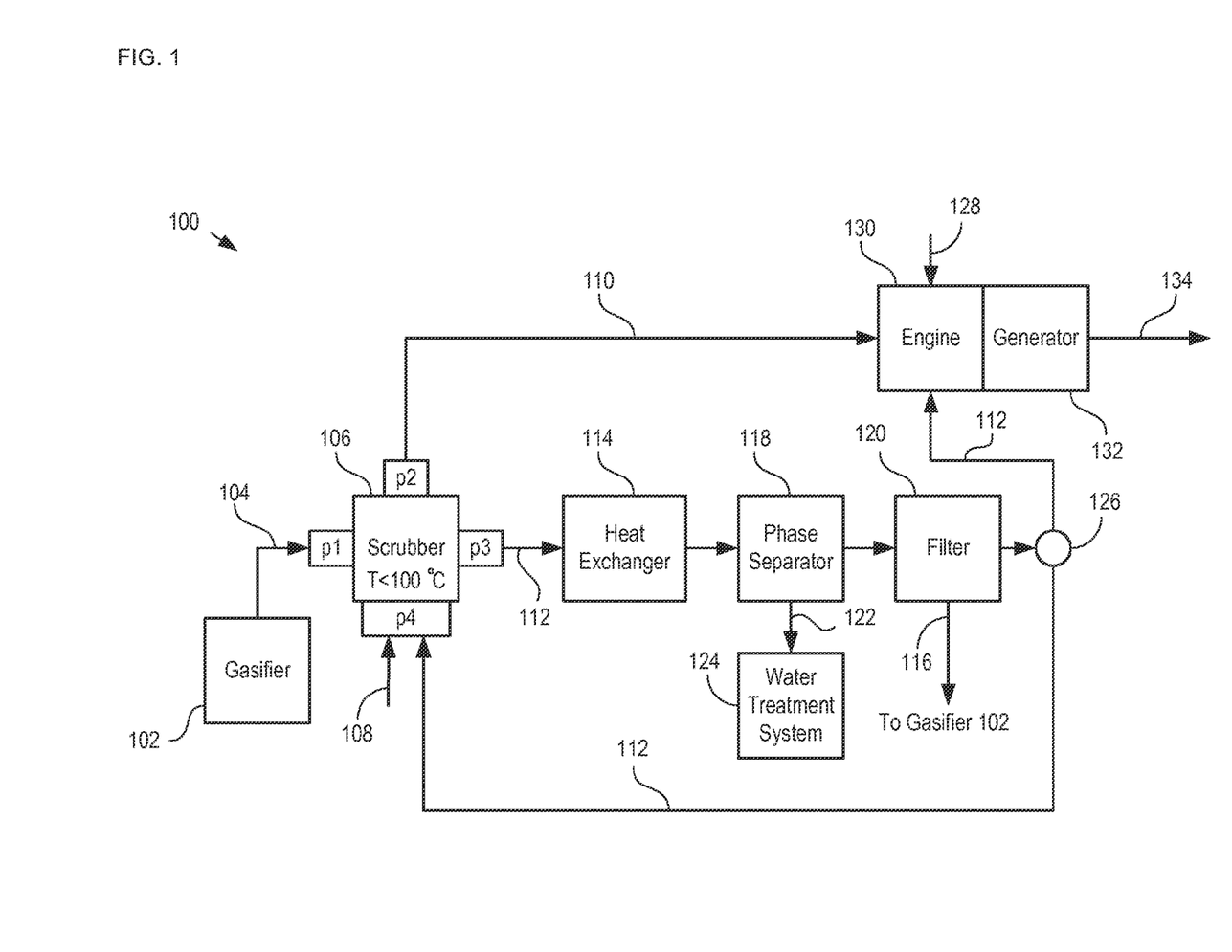
FIG. 1 depicts a schematic drawing of an electrical-energy generation system in accordance with an illustrative embodiment of the present invention.

FIG. 1 depicts a schematic drawing of an electrical-energy generation system in accordance with an illustrative embodiment of the present invention. FIG. 1 comprises gasifier 102, scrubber 106, heat exchanger 114, phase separator 118, filter 120, water treatment system 124, control valve 126, engine 130, and generator 132. For clarity, some common energy-conversion system features, such as emergency flare ports, rupture disks, pumps, and the like, are not included in FIG. 1.

Figure 2:
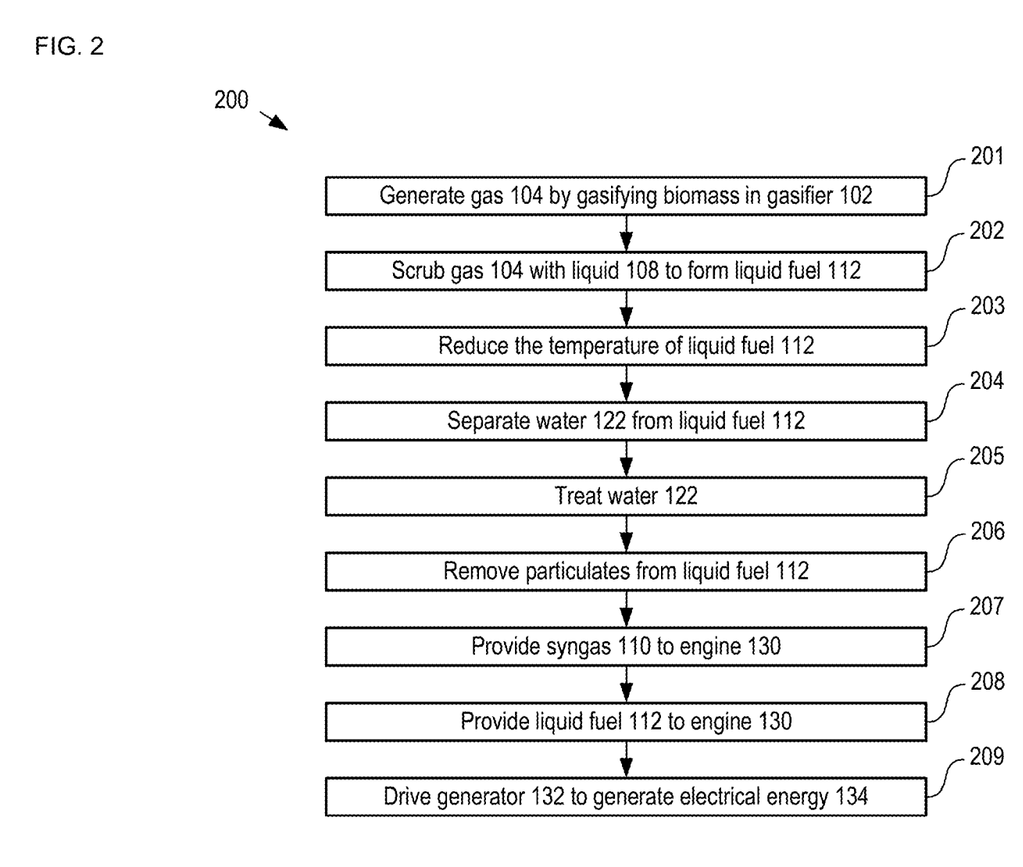
FIG. 2 depicts a method for generating electrical-energy in accordance with the illustrative embodiment of the present invention.

FIG. 2 depicts a method for generating electrical-energy in accordance with the illustrative embodiment of the present invention. Method 200 begins with operation 201, wherein gasifier 102 generates syngas from biomass. Method 200 is described with continuing reference to FIG. 1.

Gasifier 102 is a conventional gasifier that converts biomass into gas 104. Gas 104 comprises syngas and a first concentration of tars. Preferably, gasifier 102 is an updraft gasifier; however, the present invention is suitable for use with any gasifier. Gasifiers suitable for use with the present invention include, without limitation, fixed-bed gasifiers (updraft or downdraft), moving-bed gasifiers, fluidized-bed gasifiers, entrained-flow gasifiers, plasma gasifiers, and rotary kiln gasifiers.

To date, updraft gasifiers have been little used in prior-art waste-to-energy conversion systems because of the fact that they generate high levels of tar. The use of the present invention with an updraft gasifier, however, affords embodiments of the present invention with additional advantages over prior-art waste-to-energy conversion systems by exploiting the fact that updraft gasifiers generate a greater amount of tars during operation than other types of gasifiers. An evaluation of the products from updraft gasifiers reveals that the tar is about 90% oxygenated low molecular weight hydrocarbon and single ring aromatic compounds. Less than 10% are the troublesome polyaromatic hydrocarbons (PAH) as compared to 25% PAH produced by downdraft gasification. Embodiments of the present invention that are used with updraft gasifiers, therefore, are capable of extracting more usable energy from a biomass than embodiments used with other types of gasifiers. Further, updraft gasifiers generate output gas that has less particulate than other types of gasifiers, which affords embodiments of the present invention advantage over prior-art systems that are not compatible with updraft gasifiers.

In contrast to the illustrative embodiment, prior-art systems for gasifying waste on a small scale are commonly based on gasifiers that produce low tar levels. Small, downdraft wood-gasifiers can efficiently produce low-tar syngas when operating under ideal conditions. Unfortunately, attempts to adapt downdraft gasifiers for waste-to-energy applications have been relatively unsuccessful. Such gasifiers require consistent, dense, dry, energy rich feedstock; however, waste is inherently inconsistent in composition, moisture and density. As a result, the waste stream has to be sorted, shredded, dried and then densified to make it compatible with the gasification process. Even after mixed waste has been preprocessed, downdraft gasification has been found to be unreliable due to inherent channeling and clinkering issues from the irregular and unpredictable gasification rates of mixed cellulosic, petroleum-derived, and non-combustible materials in shredded waste pellets.

At operation 202, scrubber 106 scrubs gas 104 with liquid 108 such that tars contained in gas 104 are absorbed and dissolved in liquid 108 to form liquid fuel 112.

Scrubber 106 is a conventional scrubber that employs a scrubbing technique that, while similar to conventional chemical-process scrubbing techniques, is based on a scrubbing medium of liquid fuel. Scrubber 106 includes ports p1, p2, p3, and p4. Scrubber 106 receives gas 104 at port p1.

Liquid 108 comprises diesel fuel provided to scrubber 106 at port p4. Liquid 108 is provided at a temperature that is lower than the boiling point of the tar constituents in gas 104 and liquid 108. By maintaining scrubber 106 and liquid 108 in this temperature range, the tar constituents in gas 104 readily condense and dissolve in liquid 108 to form additional liquid fuel. Scrubber 106 provides liquid 108 and the additional liquid fuel at port p3 as liquid fuel 112.

In the illustrative embodiment, liquid 108 is provided to scrubber 106 at a temperature within the range of approximately 30° C. to approximately 50° C. It will be clear to one skilled in the art after reading this Specification, however, how to make and use alternative embodiments of the present invention wherein liquid 108 is provided at any temperature below the boiling point of the tar constituents in gas 104.

It should be noted that because the temperature of liquid 108 is below the boiling point of water, water-wet acids, such as hydrochloric acid, can form in liquid fuel 112. As a result, in embodiments where the temperature of liquid 108 is maintained below 100° C., additional infrastructure (e.g., condensers, neutralizers, acid-resistant metals, etc.) is included to decant water from liquid fuel 112 and avoid corrosion.

Although in the illustrative embodiment liquid 108 is diesel fuel, it will be clear to one skilled in the art, after reading this specification, how to specify, make, and use alternative embodiments of the present invention wherein liquid 108 comprises any one or a combination of petrochemical-based fuels. Fuels suitable for use in liquid 108 include, without limitation, diesel oil, gasoline, bunker fuel, jet fuel (e.g., JP-8, etc.), heating oil, boiler fuel, and the like.

One skilled in the art will recognize that the aromatic content of typical petrochemical-based fuels is relatively low, compared to what would typically be acceptable for use in most internal combustion engines designed for these purposes. For example, JP-8 jet fuel has been found to have aromatic content of approximately 17%, yet its specification limit is typically 25%. As a result, a considerable amount of tars can be dissolved in JP-8 jet fuel before the fuel exceeds the aromatic content specification limit.

In some alternative embodiments, water is used as liquid 108 instead of a liquid petrochemical-based fuel. In such embodiments, system 100 includes a liquid-to-liquid exchanger unit for enabling the transfer of some or all of the absorbed tars from the water to a petrochemical-based fuel.

In some alternative embodiments, liquid 108 comprises a liquid having phase-separation characteristics suitable for additional separation processes—for example, silicone oil, which can reject the water-phase and the tar-phase, thereby resulting in three-phase separation.

At operation 203, the temperature of liquid fuel 112 is reduced to a temperature suitable for use by engine 130 at heat exchanger 114.

Heat exchanger 114 is a conventional heat exchanger that reduces the temperature of liquid fuel 112 to facilitate its use in engine 128.

At operation 204, phase separator 118 separates out water contained in liquid fuel 112.

Phase separator 118 is a conventional phase separator that receives liquid fuel 112 from heat exchanger 114 and separates the oil phase and water phase to remove water 122 from the liquid fuel.

At operation 205, water 122 is treated to make it suitable for leaching into the soil at the deployment site of system 100. Water 122 is treated at water treatment system 124, where it is neutralized with sodium hydroxide, bleached to at least partially oxidize organic matter and sent to carbon beds where the organics are removed. After removal of the organic material, the now-purified water is allowed to drain into the surrounding soil. Once they have become saturated with organic material, the carbon beds can be fed to gasifier 102 as part of the biomass to recover the energy of the water-soluble organics they have captured. It should be noted that water treatment system 124 represents only one of many systems suitable for treating water 122. It will be clear to one skilled in the art how to specify, make, and use alternative systems and methods for treating water 122 in accordance with the present invention.

Liquid fuel 112 can often include particulates absorbed from gas 104 during scrubbing. At operation 206, therefore, scrubber 106 provides liquid fuel 112 to filter 120, which removes some or all of these particulates from liquid fuel 112. In some embodiments, particulates and heavier aromatics removed from liquid fuel 112 (e.g., soot, other non-fuel-soluble entities, etc.) are returned as effluent 116 to the gasifier for additional gasification.

At operation 207, scrubber 106 provides syngas 110 to engine 130 at port p2. In some embodiments, a condenser and phase separator are included in system 100 to treat syngas 110 prior to its use by engine 130 to, among other things, lower its temperature and condense water vapor out of the gas stream.

Engine 130 is an internal combustion engine that is designed to run on syngas 110 and liquid fuel 112. Engine 130 includes air intake 128.

Syngas 110 is substantially gas 104, but is characterized by a lower concentration of tars. In some cases, scrubber 106 further enables the passage of volatile organic carbon compounds (e.g., methane, ethane, ethylene, etc.) into syngas 110, thereby increasing its energy density. It should be noted that in some embodiments, syngas 110 includes volatile constituents of liquid 108 as well.

At operation 208, control valve 126 receives liquid fuel 112 from filter 120 and provides a first portion of the fuel to engine 130, while feeding back a second portion of the fuel to scrubber 106. Typically, more liquid is required for scrubbing than is required for running engine 130. As a result, feeding some of liquid fuel 112 back to scrubber 106 augments the amount of liquid available for scrubbing and provides a method for removal of some of the heat contained in gas 104 from the scrubber.

At operation 209, engine 130 drives generator 132 to produce electrical energy 134.

As discussed above, operation 202 can be performed with liquid 108 being provided at any temperature lower than the boiling point of the tar constituents in gas 104. It should be noted that there are benefits to maintaining the temperature of liquid 108 above the boiling point of water as well. In some embodiments, therefore, liquid 108 is provided at a temperature within the range from the boiling point of water to the boiling point of the tar constituents in gas 104.

Figure 3:
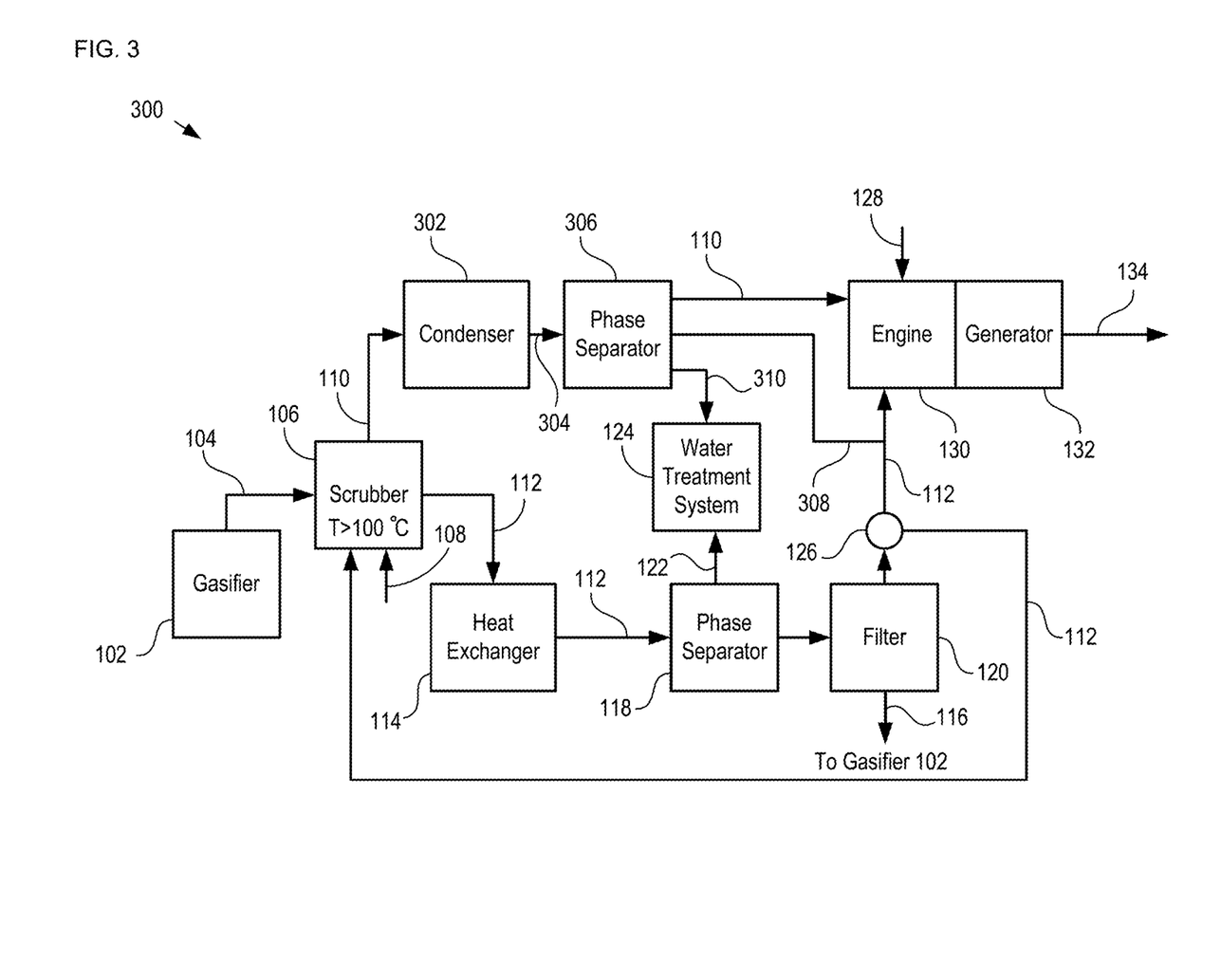
FIG. 3 depicts a schematic drawing of a waste-to-energy conversion system in accordance with a first alternative embodiment of the present invention.

FIG. 3 depicts a schematic drawing of a waste-to-energy conversion system in accordance with a first alternative embodiment of the present invention. System 300 comprises system 100 as well as condenser 302 and phase separator 306.

Figure 4:
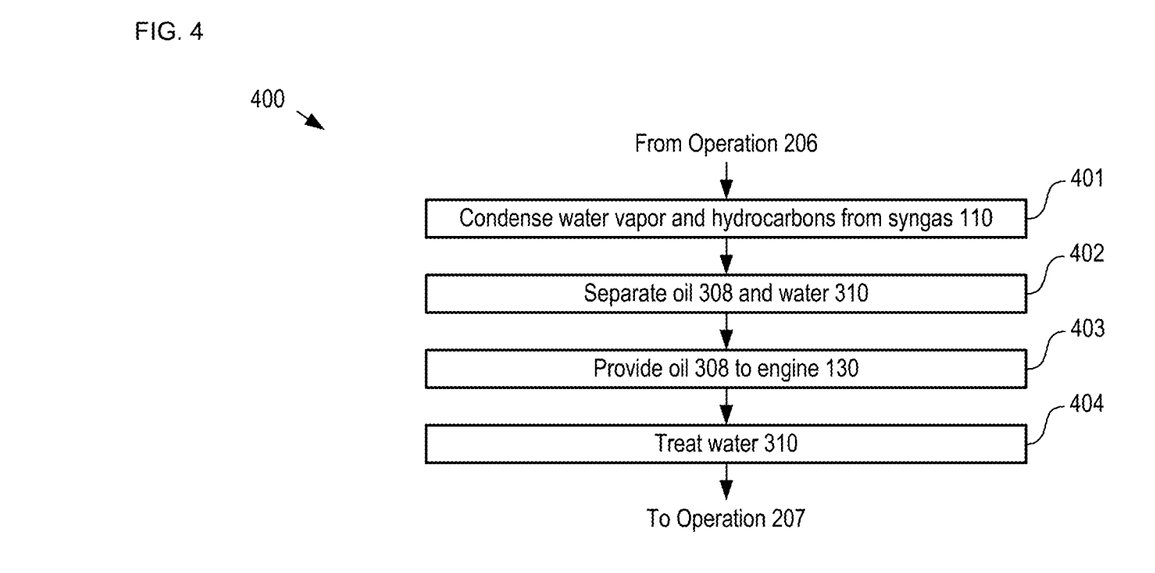
FIG. 4 depicts operations of a method suitable for converting biomass to electrical energy in accordance with the first alternative embodiment of the present invention.

FIG. 4 depicts operations of a method suitable for converting biomass to electrical energy in accordance with the first alternative embodiment of the present invention. Method 400 begins with operations 201 through 206 of method 200 described above and with respect to FIGS. 1 and 2. It should be noted that the operations of methods 200 and 400 can performed in any practical order.

In method 400, the temperature of liquid 108 is maintained in scrubber 106 at a temperature above the boiling point of water—for example, within the range of approximately 105° C. to approximately 110° C. In this range, the tar constituents in gas 104 still condense and dissolve in liquid 108; however, by maintaining the temperature of scrubber 106 above 100° C., the formation of water-wet acids is avoided. It should be noted that maintaining liquid 108 above 100° C. in scrubber 106 will result in some evaporation of diesel fuel into the syngas stream. The energy of this evaporated diesel fuel will be recovered, however, via its use in combustion within engine 130.

At operation 401, water, low boiling tar compounds, and fuel constituent vapors in syngas 110 are removed at condenser 302.

Condenser 302 is a conventional heat exchanger configured to lower the temperature of syngas 110 below 100° C. This induces water vapor and hydrocarbons in syngas 110 to condense into their liquid phases and form liquid 304. In some embodiments, a caustic soda is mixed into condenser 302 to reduce the acidity of the condensed fluid.

At operation 402, phase separator 306 receives liquid 304 from condenser 302 and separates the oil phase and water phase to produce oil 308 and water 310. Phase separator 306 is analogous to phase separator 118.

At operation 403, oil 308 is provided to engine 130 for combustion. In some embodiments, oil 308 is added to the fuel stream comprising liquid fuel 112 prior to its injection into engine 130. In some embodiments, at least some of oil 308 is fed back to scrubber 106 to augment liquid 108 for scrubbing gas 104.

At operation 404, water 310 is treated so that it is suitable for leaching into the soil at the deployment site of system 300. Water 310 is treated at water treatment system 124, where it is bleached to at least partially oxidize organic matter and sent to carbon beds where the organics are removed. After removal of the organic material, the now-purified water is allowed to drain into the surrounding soil. Once they have become saturated with organic material, the carbon beds can be fed to gasifier 102 as part of the biomass to recover the energy of the water-soluble organics they have captured.

Novel Tar-Reformation Approach Using a Non-Thermal Plasma

In some embodiments of the present invention, a plasma-based tar reformation system is included to enable cracking of less-combustible heavy tars into tar constituents that are more usable by engine 130.

Figure 5:
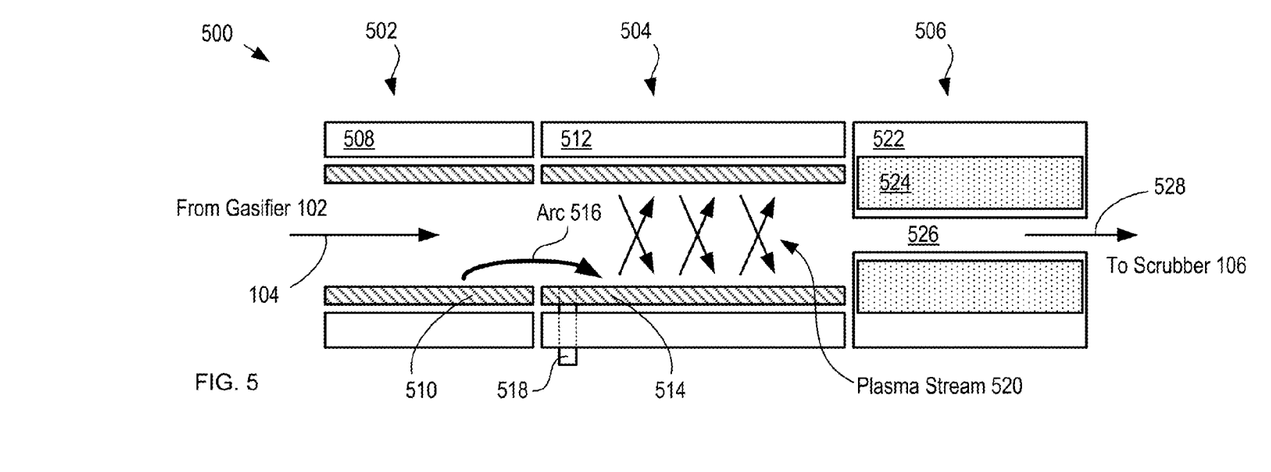
FIG. 5 depicts a schematic drawing of a tar reformation system in accordance with a second alternative embodiment of the present invention.

FIG. 5 depicts a schematic drawing of a tar reformation system in accordance with a second alternative embodiment of the present invention. System 500 comprises input port 502, plasma reactor 504, and catalyst bed 506.

Figure 6:
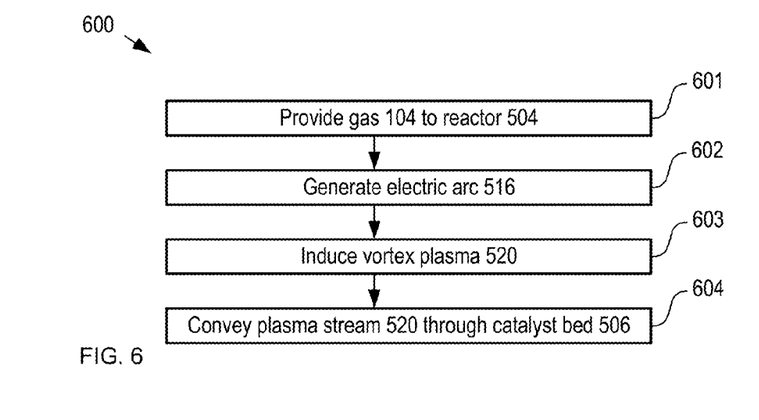
FIG. 6 depicts operations of a method suitable for reforming tars in a syngas stream output by a biomass gasifier in accordance with the second alternative embodiment of the present invention.

FIG. 6 depicts operations of a method suitable for reforming tars in a syngas stream output by a biomass gasifier in accordance with the second alternative embodiment of the present invention. Method 600 begins with operation 601, wherein syngas 110 from gasifier 104 is received at input port 502, which provides the syngas to plasma reactor 504.

Input port 502 is a conventional gas port that comprises housing 508 and electrode 510. Electrode 510 is typically an annular electrode disposed on the interior surface of housing 508.

Plasma reactor 504 is a gliding-arc, non-thermal plasma reactor suitable for supporting the formation of a vortex plasma. Plasma reactor 504 comprises housing 512, electrode 514, and gas port 518.

Plasma systems suitable for tar reformation have historically been based on either thermal or non-thermal plasmas. Thermal plasma systems include arc discharges and are associated with Joule heating and thermal ionization, and a thermal plasma can reach temperatures over 10,000 K. Unfortunately, the absence of chemical selectivity and high temperature results in very little control over chemical processes inside a thermal plasma reactor. In addition, the high temperatures induced in a typical thermal plasma reactor add significant complexity and cost. Further, thermal-plasma tar reformation requires a great deal of input energy, which negates much of the advantage of their use in an energy-recovery system like a waste-to-energy conversion system.

In contrast, non-thermal plasma systems, including low-pressure glow, radio frequency and corona discharges, offer high selectivity as well as energy efficiency for plasma-chemical reactions. Recent advances in gliding-arc non-thermal plasma technology have led to excellent mixing of gas and plasma, which has resulted in highly active, non-equilibrium reactions. As a result, the use of gliding-arc non-thermal plasma in plasma reactor 504 enables embodiments of the present invention to exploit the advantages of this technology to enable robust tar reformation at a fraction of the parasitic energy loss incurred by thermal plasma-based systems. Additionally, the use of a non-thermal plasma reactor reduces heating of the syngas, enabling better overall energy balance of plant-size tar reduction processes.

At operation 602, electrodes 510 and 514 generate electrical arc 516. Electrical arc 516 induces the formation of a plasma in plasma reactor 504.

At operation 603, plasma-gas is introduced into plasma reactor 504 at gas port 518. Gas port 518 is oriented such that the plasma gas is introduced to the reactor tangentially and at high-pressure so that a swirling action of the syngas/plasma-gas mix is induced. This swirling action, in combination with the plasma induced by electrical arc 516, creates vortex-shaped plasma stream 520. Due to their heavier molecular weight, tar molecules migrate to the perimeter of the swirling stream, which is the area of most intensive electrical arcing. The lighter weight (and more desirable) hydrogen and carbon monoxide molecules remain more toward the center of the reactor and are not affected as strongly by the plasma.

At operation 604, plasma stream 520 is conveyed through catalyst bed 506.

Catalyst bed 506 comprises housing 522 and annular-shaped catalyst 524, which collectively define center port 526. Catalyst bed 506 is designed to act upon the weight-induced separation of heavy tar molecules from the lighter hydrogen and carbon monoxide molecules. Center port 526 enables hydrogen and carbon monoxide in the syngas stream to substantially bypass catalyst 524 without affect. The heavier tar molecules in the syngas stream, however, are exposed to catalyst 524. As a result, the heavy tar molecules selectively react with catalyst 524 to reform at least a portion of the tar into a gas that contains lower molecular weight hydrocarbon molecules and, typically, carbon monoxide and hydrogen. Output gas stream 528, therefore, comprises syngas 110 as well as the hydrogen and carbon monoxide provided by plasma reactor 504 and the hydrogen and carbon monoxide that result from the catalytic conversion process in catalytic bed 506. In some embodiments, an additional stream of gas (e.g., steam or air) is included in catalyst bed 506 to provide species for reaction with the tar molecules.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
   (1) a scrubber, the scrubber including;
      (a) a first port that is fluidically coupled with a source of the first gas, the first gas comprising syngas and tars, wherein the tars have a first concentration in the first gas;
      (b) a second port that is fluidically coupled with an internal-combustion engine such that the second port provides a second gas to the internal-combustion engine, the second gas including syngas and having a second concentration of tars that is lower than the first concentration; and
      (c) a third port that is fluidically coupled with the internal-combustion engine such that the third port provides a first liquid fuel to the internal-combustion engine, the first liquid fuel comprising tars dissolved in the first liquid; and
   (2) the internal-combustion engine, the internal-combustion engine being physically adapted to operate with the second gas and the first liquid fuel.

2. The apparatus of claim 1 further comprising (3) a gasifier that is physically adapted to gasify a biomass and produce the first gas, the gasifier being fluidically coupled with the first port.

3. The apparatus of claim 2 wherein the gasifier is an updraft gasifier.

4. The apparatus of claim 2 wherein the gasifier is a downdraft gasifier.

5. The apparatus of claim 2 wherein the gasifier is a gasifier selected from the group consisting of fixed-bed gasifiers, moving-bed gasifiers, fluidized bed gasifiers, plasma gasifiers, entrained-flow gasifiers, and rotary kiln gasifiers.

6. The apparatus of claim 1 further comprising (3) a reactor for enabling a liquid-liquid transfer of the first liquid fuel from the first liquid to a second liquid fuel, wherein the first liquid comprises water.

7. The apparatus of claim 1 wherein the first liquid comprises diesel fuel.

8. The apparatus of claim 1 wherein the first liquid comprises bunker fuel.

9. The apparatus of claim 1 wherein the first liquid comprises jet fuel.

10. The apparatus of claim 1 wherein the first liquid comprises heating oil.

11. The apparatus of claim 1 wherein the first liquid comprises boiler fuel.

12. The apparatus of claim 11 wherein the engine is further dimensioned and arranged to operate with the second liquid fuel.

13. The apparatus of claim 1 further comprising:
   (3) a reactor that is fluidically coupled with the source of the first gas, the reactor being operative for inducing a plasma that includes the first gas and has a vortex shape; and (4) a catalyst that is operatively coupled with the reactor, the catalyst being physically adapted to induce decomposition of tar molecules into a third gas comprising lower molecular weight hydrocarbon molecules.

14. An apparatus comprising:

a gasifier, the gasifier being an updraft gasifier that is physically adapted to generate a first gas from a biomass, wherein the first gas comprises syngas and tars;

a first reactor comprising a scrubber that is operative for scrubbing the first gas with a first liquid comprising a first petrochemical such that absorption of tars in the first liquid gives rise to a second liquid comprising a second petrochemical; and an engine, wherein the engine is an internal combustion engine that is physically adapted for operation with syngas, the first petrochemical, and the second petrochemical, and wherein the engine is fluidically coupled with the first reactor to enable receipt of the second gas, the first liquid, and the second liquid.

15. The apparatus of claim 14 wherein the petrochemical is selected from the group consisting of diesel fuel, bunker fuel, jet fuel, heating oil, and boiler fuel.

16. The apparatus of claim 14 further comprising:

a second reactor that is fluidically coupled with the gasifier, the second reactor being dimensioned and arranged to induce a plasma having a vortex shape, wherein the plasma is suitable for decomposing at least a first portion of the first gas into a third gas comprising lower molecular weight hydrocarbons; and a catalyst bed that is fluidically coupled with the second reactor to receive the third gas and a fourth gas comprising a second portion of the first gas, the catalyst bed including a catalyst suitable for inducing decomposition of tar molecules into a fifth gas comprising lower molecular weight hydrocarbons, wherein the catalyst is shaped to define a channel suitable to convey the third gas and the fourth gas through the catalyst bed such that the third gas and fourth gas substantially bypass the catalyst.

17. A method comprising:

providing a first gas that includes syngas and a first concentration of tars;

mixing the first gas with a first liquid, wherein the first liquid absorbs tars from the first gas to provide a second gas having a second concentration of tars that is less than the first concentration of tars;

converting the absorbed tars into a first liquid fuel; and providing the second gas and the first liquid fuel to an engine that is operable with syngas and the first liquid fuel.

18. The method of claim 17 further comprising:

providing the first liquid as water;

enabling a liquid-liquid transfer of the first liquid fuel from the first liquid to a second liquid fuel; and providing the second liquid fuel to an engine that is operable with syngas, the first liquid fuel, and the second liquid fuel.

19. The method of claim 17 further comprising providing the first liquid as a liquid fuel selected from the group consisting of diesel fuel, bunker fuel, jet fuel, heating oil, and boiler fuel.

20. The method of claim 17 further comprising:

forming a plasma comprising the first gas, the plasma having a vortex shape, wherein the plasma decomposes a first portion of the first gas into a third gas comprising lower molecular weight hydrocarbons;

channeling the third gas through a catalyst bed comprising a catalyst suitable for inducing decomposition of tar molecules into lower molecular weight hydrocarbons; and exposing a second portion of the second gas to the catalyst, wherein the second portion of the second gas comprises tars.

21. An apparatus comprising:

a reactor that dimensioned and arranged to receive a first gas that includes syngas and tars, the reactor being physically adapted to induce a vortex-shaped plasma comprising the first gas, wherein the plasma is suitable for decomposing a first portion of the first gas into a second gas comprising lower molecular weight hydrocarbons; and a catalyst bed that is fluidically coupled with the second reactor to receive the second gas and a second portion of the first gas, the catalyst bed including a catalyst suitable for inducing decomposition of tar molecules into a third gas comprising lower molecular weight hydrocarbons, wherein the catalyst is shaped to define a channel suitable to convey the second gas through the catalyst bed such that it substantially bypasses the catalyst.

* * * * *